Dec. 5, 1961  G. A. MUSSER  3,011,285
FISHING BOBBERS
Filed Aug. 20, 1958
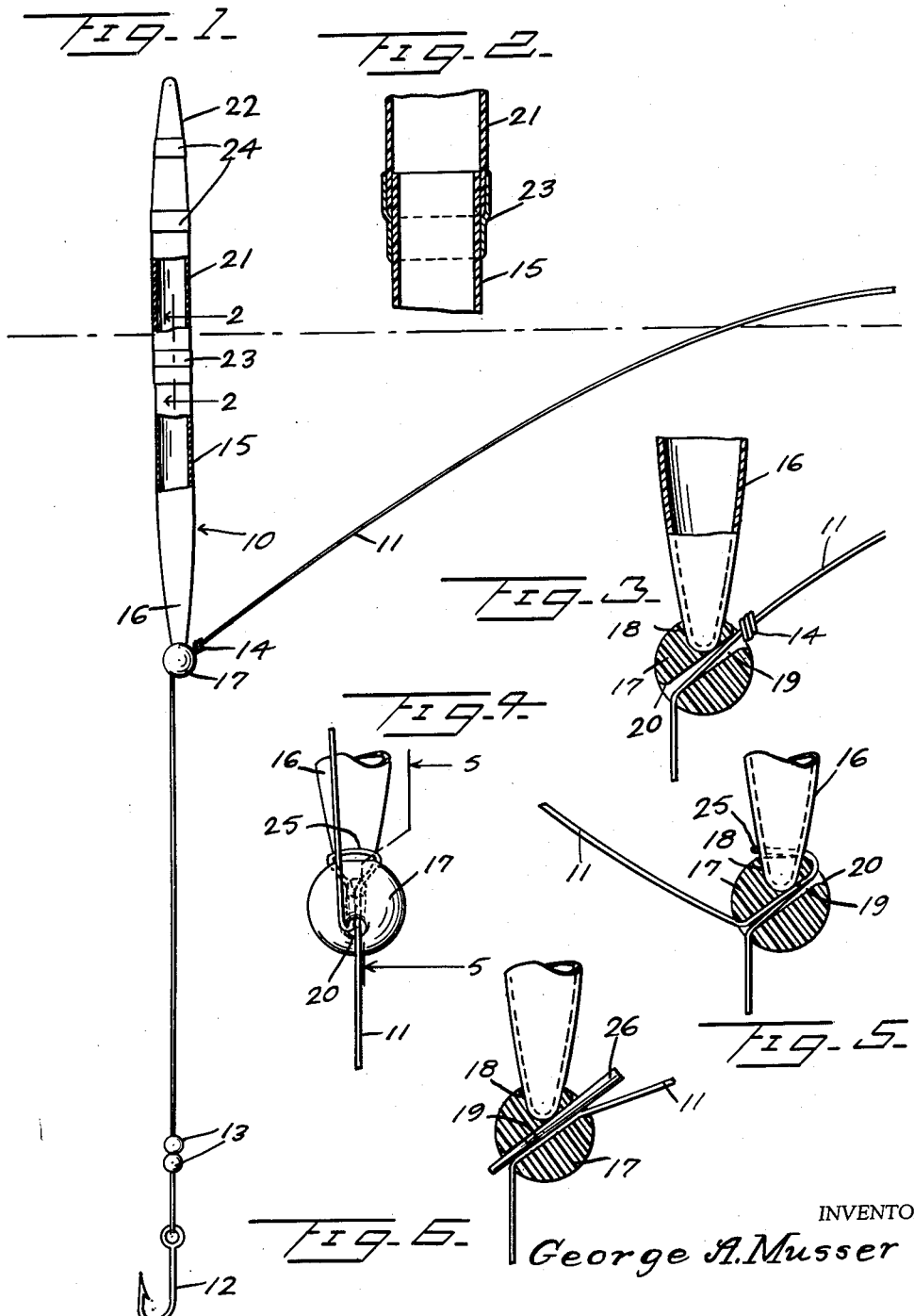
INVENTOR
George A. Musser
BY Kimmel & Crowell
ATTORNEYS

United States Patent Office 3,011,285
Patented Dec. 5, 1961

3,011,285
FISHING BOBBERS
George A. Musser, R.R. 2, Silver Lake, Ind.
Filed Aug. 20, 1958, Ser. No. 756,210
1 Claim. (Cl. 43—44.87)

The present invention relates to fishing bobbers and particularly to fishing bobbers adapted for attachment to an intermediate point of a fish line.

The primary object of the invention is to provide a fishing bobber which can be quickly connected to a fish line and which is extremely light in weight and small in size, to avoid unduly disturbing the fish.

Another object of the invention is to provide a fishing bobber of the class described above having an integral ball formed thereon at the lower end thereof to provide means for attaching the fishing line to the bobber.

A further object of the invention is to provide a fishing bobber formed of plastic tubular members having their opposed ends closed and their adjacent ends telescopically sealed together.

Other objects and advantages will become apparent in the following specification when considered in light of the attached drawings in which:

FIGURE 1 is a side elevation of the invention shown partially broken away for convenience of illustration;

FIGURE 2 is a vertical cross section taken along the line 2—2 of FIGURE 1, looking in the direction of the arrows;

FIGURE 3 is an enlarged fragmentary vertical cross section of the lower end of the bobber illustrated in FIGURE 1;

FIGURE 4 is an enlarged side elevation of the lower end of the bobber illustrated in FIGURE 1, showing a second method of attaching the fish line to the bobber;

FIGURE 5 is a vertical cross section taken along the line 5—5 of FIGURE 4, looking in the direction of the arrows; and FIGURE 6 is a view similar to FIGURE 5 illustrating a third method of connecting the fish line to the bobber.

Referring now to the drawings in detail wherein like reference characters indicate like parts throughout the several figures, the reference numeral 10 indicates generally a fish line bobber constructed in accordance with the invention.

The fish line bobber 10 is attached to a fish line 11 having a hook 12 secured to the terminal end thereof and a plurality of weights 13 secured thereto adjacent the hook 12. The fish line 11 is knotted at 14, for reasons to be assigned.

The bobber 10 includes a light tubular plastic member 15 of generally cylindrical shape having a lower conical portion 16 integrally formed thereon. A solid ball 17 is provided with a socket 18 which engages over the lower tip of the conical portion 16 and is secured thereto by plastic adhesive means.

The ball 17 has a bore 19 extending generally transversely therethrough with the lower end opening into said ball at a point adjacent to and spaced from the peripheral portion of the ball opposite to the socket and having the upper end opening out of the ball at a point diametrically opposed to the first-named point. The bore 19 has the opposite ends filleted at 20 to prevent chafing of the fish line 11.

A second tubular plastic member 21 is of generally cylindrical shape and has an upper conical sealed extension 22 integrally formed thereon. The member 21 has a diameter slightly larger than the member 15 telescopically engaging thereover, as seen in FIGURE 2. The member 15 and the member 21 are adhesively secured together and the juncture therebetween is covered with a plastic sealing band 23 which engages thereabout and is adhesively secured thereto. Pigmented bands of applied plastic 24 are positioned on the member 21 for decorative and identification purposes.

In FIGURES 1 and 3 the fish line 11 is simply threaded through the bore 19 and the knot 14 prevents the fish line 11 from sliding through the bore 19 beyond the predetermined desired distance. With the fish line connected in this manner to the bobber 10, the knot 14 can be moved to vary the depth of the hook 12. In FIGURES 4 and 5 the fish line 11 is doubled and passed through the bore 19 from the lower end thereof and the loop 25 formed thereby is passed over the upper end of the bobber 10 and is moved downwardly into engagement with the lower end of the bobber 10 and the ball 17, by drawing the fishing line 11 through the bore 19. In this position the bobber 10 is restrained from movement with respect to the line 11 in either direction thereon, and can be adjusted to a new position by simply loosening the loop 25 and adjusting the bobber 10 on the line 11.

In FIGURE 6 the bobber 10 is attached to the line 11 by having the line 11 threaded through the bore 19 and secured in position therein by means of a wedge-shaped pin 26 forced into the bore 19 to clamp the fish line 11 in adjusted position therein. Obviously, to adjust the bobber with respect to the line 11 one need only to loosen the wedge pin 26 and retighten it after the bobber 10 has been moved to its adjusted position on the line 11.

Having thus described the preferred form of the invention, it should be understood that numerous structural modifications and adaptations may be resorted to without departing from the scope of the appended claim.

What is claimed is:

A fishing bobber comprising a pair of longitudinal plastic members telescopically engaged together, a plastic sealing band surrounding the juncture of said members adhesively securing said members together in sealed relation, said members each having a conical closed end portion integrally formed thereon at the opposite ends thereof, pigmented identification bands surrounding said members at spaced intervals, a solid ball having a socket formed therein, means adhesively securing the lower tip of one of said members in the socket in said ball, said ball having an upwardly sloping straight bore of constant diameter extending therethrough, adapted for the reception of a fishing line, with the lower end of said bore opening into said ball at a point adjacent to and spaced from the peripheral portion of said ball opposite said socket and having the upper end of said bore opening out of said ball at a point diametrically opposed to said lower end opening, and a wedge shaped pin extending completely through said bore alongside the fishing line engaging and clamping the fishing line in adjusted position therein.

References Cited in the file of this patent

UNITED STATES PATENTS

| | | |
|---|---|---|
| 322,088 | Behrens | July 14, 1885 |
| 1,112,049 | Anthony | Sept. 29, 1914 |
| 1,317,496 | Hessler | Sept. 30, 1919 |
| 1,547,746 | Gore | July 28, 1925 |
| 2,636,305 | Shoenfelt | Apr. 28, 1953 |
| 2,792,665 | Brickler | May 21, 1957 |

FOREIGN PATENTS

| | | |
|---|---|---|
| 20,443 | Great Britain | 1891 |